(12) United States Patent
Liu

(10) Patent No.: US 10,440,135 B2
(45) Date of Patent: *Oct. 8, 2019

(54) SYSTEM AND METHOD FOR AN ADAPTIVE SEARCH ENGINE USING DOMAIN SOCIAL NETWORKING DATA

(71) Applicant: Cybeye, Inc., Torrance, CA (US)

(72) Inventor: Bing Liu, Rolling Hills, CA (US)

(73) Assignee: Cybeye, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,899

(22) Filed: Jan. 2, 2018

(65) Prior Publication Data

US 2018/0159945 A1 Jun. 7, 2018

Related U.S. Application Data

(63) Continuation of application No. 15/705,869, filed on Sep. 15, 2017, now abandoned, which is a continuation of application No. 15/277,610, filed on Sep. 27, 2016, now Pat. No. 9,813,513, which is a continuation of application No. 13/661,943, filed on Oct. 26, 2012, now Pat. No. 9,462,067.

(60) Provisional application No. 61/553,989, filed on Nov. 1, 2011, provisional application No. 61/553,657, filed on Oct. 31, 2011, provisional application No. 61/551,673, filed on Oct. 26, 2011.

(51) Int. Cl.
| | |
|---|---|
| *G06F 15/16* | (2006.01) |
| *H04L 29/08* | (2006.01) |
| *H04L 29/06* | (2006.01) |
| *H04L 12/58* | (2006.01) |

(52) U.S. Cl.
CPC .............. *H04L 67/22* (2013.01); *H04L 63/14* (2013.01); *H04L 67/02* (2013.01); *H04L 51/22* (2013.01); *H04L 51/32* (2013.01)

(58) Field of Classification Search
CPC ....... H04L 63/08; H04L 63/14; H04L 63/104; H04L 63/1408; G06F 3/0488
See application file for complete search history.

(56) References Cited

U.S. PATENT DOCUMENTS

| | | |
|---|---|---|
| 9,262,067 B1 | 10/2016 | Liu |
| 2006/0075028 A1 | 4/2006 | Zager et al. |
| 2006/0212930 A1 | 9/2006 | Shull et al. |
| 2007/0150603 A1 | 6/2007 | Crull |
| 2010/0013829 A1 | 6/2010 | Ramer et al. |
| 2010/0268585 A1 | 10/2010 | Padveen et al. |
| 2010/0274815 A1 | 10/2010 | Vanasco |
| 2012/0198549 A1 | 8/2012 | Antonakakis |

(Continued)

*Primary Examiner* — Yves Dalencourt
(74) *Attorney, Agent, or Firm* — Armstrong Teasdale LLP; Edward F. Behm, Jr.

(57) ABSTRACT

An engine, system and method for a domain social network that interconnects Internet users with at least domains owned by or of interest to those Internet users, and that may obtain and/or forward obtained dynamic data regarding those domains automatically, such as by web service or email service. The dynamic data may be used to filter and protect content and data of the respective domains, to protect users by identifying low quality web pages or malicious software or pages, to isolate or improve search results regarding the domain, and/or to improve Internet-based transaction flow, such as the creation of advertising.

20 Claims, 9 Drawing Sheets

(56) References Cited

U.S. PATENT DOCUMENTS

2013/0103686 A1     4/2013  Sisneros
2013/0218965 A1     8/2013  Abrol
2016/0360382 A1*   12/2016  Gross .................... G06F 3/0488
2017/0270206 A1*    9/2017  Katic .................... G06Q 50/01

* cited by examiner

☐ Easy, Smart, FREE! Just add the bookmarklette to your web browser to enjoy WoneClick of check, like, share or follow when you surf to any web page.

Step 1. Make sure to enable bookmark bar / favorite bar in your browser. If not visible, go to Tool menu to enable it.
Step 2. Go to http://www.mitracking.com/MyAccount and from its right top corner drag MiTracking link to your bookmark bar / favorite bar or right click on MiTracking link to add it to your favorite bar when using Interweb Explorer or its compatible browsers.

Now you have MiTracking bookmark ready to use. When you visit any web page, click MiTracking bookmark you will see the web page information with Mi Like, Tweeter, Facebook recommend as well as the information about the website recommend and etc. to share the web page with your friends instantlyl. You could follow any website for its social activities and comprehensive website report powered by over 8 million domain data.

Sign up free member account with your email address or if you have Facebook account already, just login with Facebook and allow you to access our service for free.

Enjoy and tell your friends!

P.S. for iFone, iPhad or other smartphone or tablet computer users those devices may not support drag and drop to add to bookmark / favorite bar, please follow the instructions at http://www.mitracking.com/MyAccount page.

FIG. 7

FIG. 11

SYSTEM AND METHOD FOR AN ADAPTIVE SEARCH ENGINE USING DOMAIN SOCIAL NETWORKING DATA

CROSS-REFERENCE TO RELATED APPLICATIONS

This application is a continuation of U.S. application Ser. No. 15/705,869, filed Sep. 15, 2017, which is a continuation of U.S. application Ser. No. 15/277,610, filed Sep. 27, 2016, which is a continuation of U.S. application Ser. No. 13/661,943, filed Oct. 26, 2012, which claims priority to U.S. Provisional Patent Application Ser. No. 61/551,673, filed Oct. 26, 2011, U.S. Provisional Patent Application Ser. No. 61/553,657, filed Oct. 31, 2011, and U.S. Provisional Patent Application Ser. No. 61/553,989, filed Nov. 1, 2011, the entireties of which are incorporated by reference herein.

FIELD OF THE INVENTION

The present invention relates to data being tracked and provided in relation to Internet browsing, and, more particularly, to an engine, system and method of providing a domain social network having business intelligence logic.

BACKGROUND OF THE INVENTION

The term "Web 2.0" is commonly associated with web applications that facilitate interactive information sharing, interoperability, user-centered design, and collaboration on the World Wide Web (WWW, also referred to hereinafter as the Internet or a network, further includes intranet, extranet, and the like). Web 2.0 thus necessarily includes aspects of connecting non-virtual identity to virtual identity on the WWW using a data feed comprised of data relationships and business and data intelligence. As used hereinthroughout, and unless otherwise noted, the term "identity" is defined to include non-virtual and/or virtual aspects of a person interacting on, with, or with others on, the WWW.

In an example of a typical social network, Facebook® connects an identity with other persons based on, for example, friendship. Further, persons using a social network platform such as the Facebook platform may generate activities, events, and the like, as indicated from the respective Facebook account associated with each respective identity. Once generated, the Facebook platform may automatically feed friends' activities, events, and the like to third person friends of the identity, such as when such activities or events are occurring or have occurred.

However, Facebook connects persons to persons, or persons/entities (such as businesses) to person/entities. Facebook does not provide any interconnection for domains associated with those persons or entities. Thus, in typical social environments such as Facebook, persons/entities generate and receive the data. That is, the Facebook platform feeds data to and from the friends identified as being associated with each identity. Needless to say, data generated in this way, and absent data monitoring regarding domain names associated with the persons/entities on Facebook, severely limits the usefulness of the data generated by such typical social sites—particularly for advertising purposes, for example.

Further, there are over 200 million domains as of 2010, and over 1.8 billion web users. These users are running approximately 15 billion web searches a year, which leads each user to 2-3 unknown websites per day, on average. Such websites, if unknown to the user and without any way for the user to have a trusted party (such as a social network friend, or a trusted domain) that indicates the acceptability of the unknown site, may pose a risk to users, such as an increased likelihood of phishing or providing malware.

Thus, there is a need for a "domain social network" that interconnects data regarding identities (i.e., persons/entities) to data regarding domains. More particularly, there is a need for an engine, system and method to generate domain data using, and that itself provides business intelligence logic, wherein data is related, such as for sales, advertising or trustworthiness, purposes, to an identity's activity.

SUMMARY OF THE INVENTION

The present invention provides an engine, system and method for a domain social network that interconnects Internet users with at least domains owned by or of interest to those Internet users, and that may obtain and/or forward obtained dynamic data regarding those domains automatically, such as by web service or email service. The dynamic data may be used to filter and protect content and data of the respective domains, to protect users by identifying low quality web pages or malicious software or pages, to isolate or improve search results regarding the domain, and/or to improve Internet-based transaction flow, such as the creation of advertising.

It is to be understood that both the foregoing general description and the following detailed description are exemplary and explanatory, and are intended to provide further explanation of the invention as discussed herein throughout.

BRIEF DESCRIPTION OF THE DRAWINGS

The accompanying drawings are included to provide a further understanding of the disclosed embodiments. In the drawings:

FIG. 5 is an illustration of aspects of the present invention; and

FIG. 6 is an illustration of aspects of the present invention;

FIG. 7 is an illustration of an aspect of the present invention;

FIG. 11 is an illustration of an aspect of the present invention.

DETAILED DESCRIPTION

A computer-implemented platform and methods of use are disclosed that provide networked access to a plurality of types of digital content, including but not limited to video, audio, and document content, and that track and deliver the accessed content. Described embodiments are intended to be exemplary and not limiting. As such, it is contemplated that the herein described systems and methods can be adapted to provide many types of users with access and delivery of many types of domain data, and can be extended to provide enhancements and/or additions to the exemplary services described. The invention is intended to include all such extensions. Reference will now be made in detail to various exemplary and illustrative embodiments of the present invention.

Figure 1:
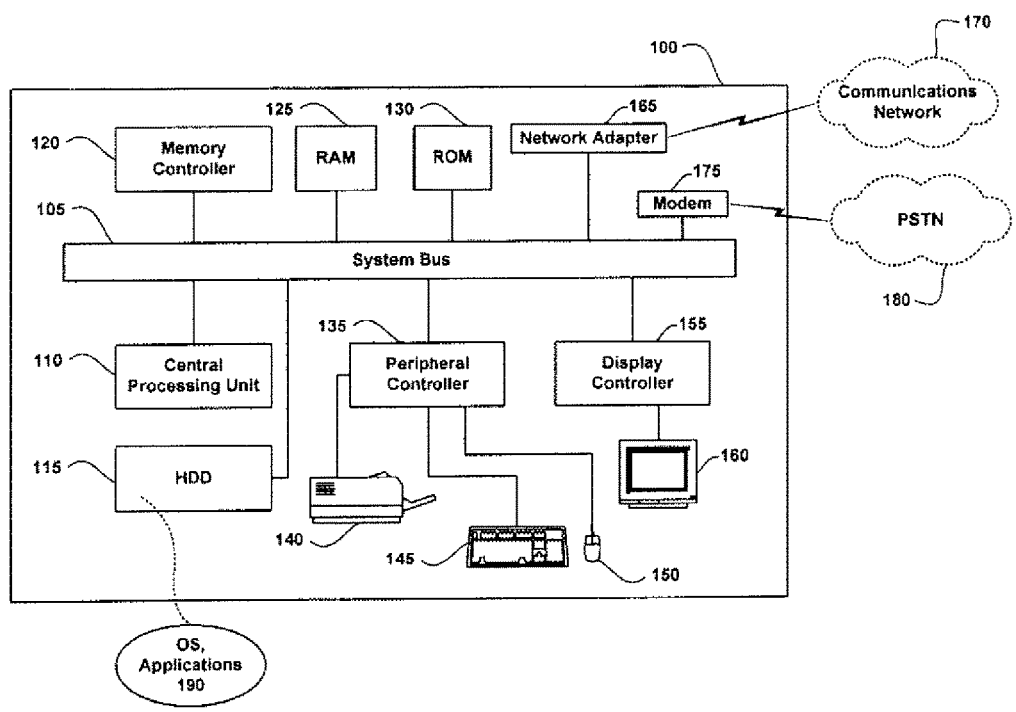
FIG. 1 is a block diagram of an exemplary computing system for use in accordance with herein described systems and methods.

FIG. 1 depicts an exemplary computing system 100 that can be used in accordance with herein described system and methods. Computing system 100 is capable of executing software, such as an operating system (OS) and a variety of computing applications 190. The operation of exemplary computing system 100 is controlled primarily by computer readable instructions, such as instructions stored in a computer readable storage medium, such as hard disk drive (HDD) 115, optical disk (not shown) such as a CD or DVD, solid state drive (not shown) such as a USB "thumb drive," or the like. Such instructions may be executed within central processing unit (CPU) 110 to cause computing system 100 to perform operations. In many known computer servers, workstations, personal computers, and the like, CPU 110 is implemented in an integrated circuit called a processor.

It is appreciated that, although exemplary computing system 100 is shown to comprise a single CPU 110, such description is merely illustrative as computing system 100 may comprise a plurality of CPUs 110. Additionally, computing system 100 may exploit the resources of remote CPUs (not shown), for example, through communications network 170 or some other data communications means.

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computing system 100 via the system's main data-transfer path. The main data-transfer path may use a system bus architecture 105, although other computer architectures (not shown) can be used, such as architectures using serializers and deserializers and crossbar switches to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing processors and support chips.

Memory devices coupled to system bus 105 can include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process' virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is the Peripheral Component Interconnect (PCI) bus.

Display 160, which is controlled by display controller 155, can be used to display visual output generated by computing system 100. Such visual output may include text, graphics, animated graphics, and/or video, for example. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet, and hence which may provide or include tracking of and access to the domain data discussed herein. Communications network 170 may provide user access to computing system 100 with means of communicating and transferring software and information electronically. For example, users may communicate with computing system 100 using communication means such as email, direct data connection, virtual private network (VPN), Skype or other online video conferencing services, or the like. Additionally, communications network 170 may provide for distributed processing, which involves several computers and the sharing of workloads or cooperative efforts in performing a task. It is appreciated that the network connections shown are exemplary and other means of establishing communications links between computing system 100 and remote users may be used.

It is appreciated that exemplary computing system 100 is merely illustrative of a computing environment in which the herein described systems and methods may operate and does not limit the implementation of the herein described systems and methods in computing environments having differing components and configurations, as the inventive concepts described herein may be implemented in various computing environments using various components and configurations.

Figure 2:
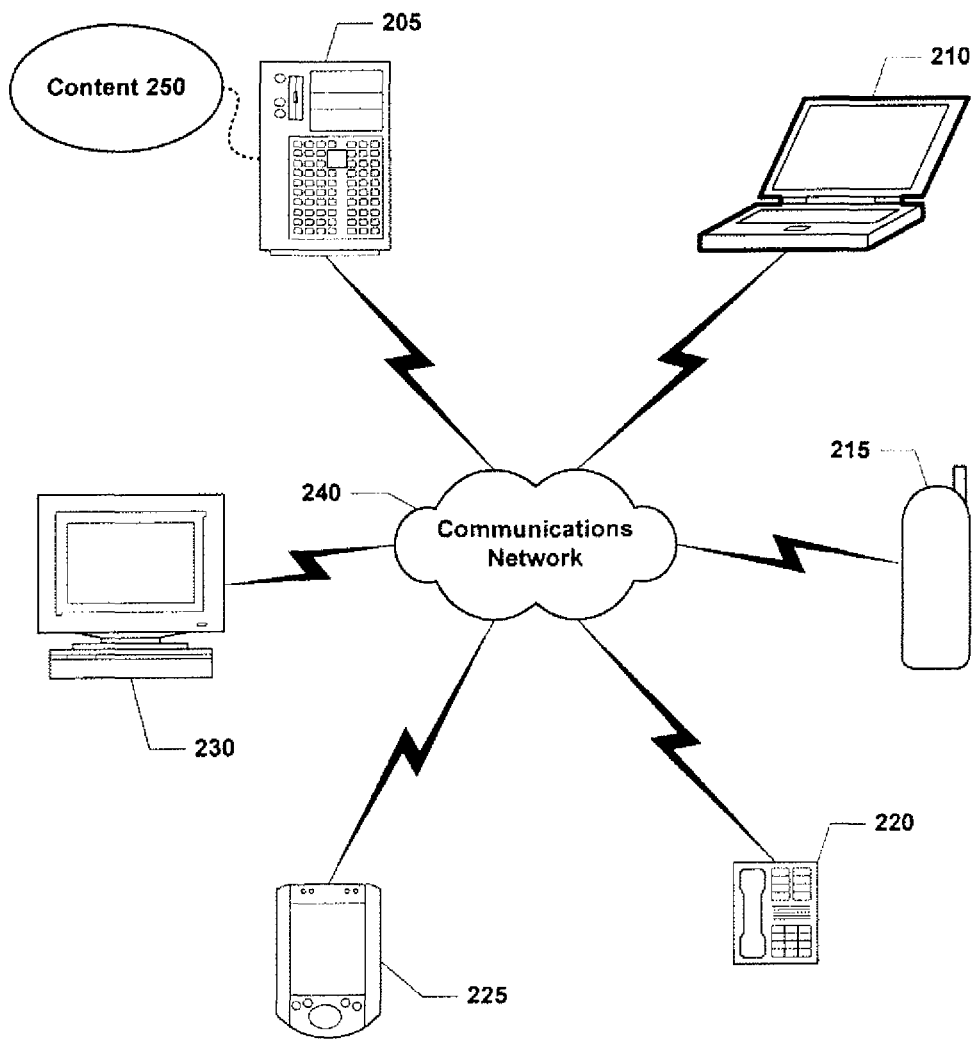
FIG. 2 is a block diagram showing an exemplary networked computing environment for use in accordance with herein described systems and methods.

As shown in FIG. 2, computing system 100 can be deployed in networked computing environment 200. In general, the above description for computing system 100 applies to server, client, and peer computers deployed in a networked environment, for example, server 205, laptop computer 210, and desktop computer 230. FIG. 2 illustrates an exemplary illustrative networked computing environment 200, with a server in communication with client computing and/or communicating devices via a communications network, in which the herein described apparatus and methods may be employed.

As shown in FIG. 2, server 205 may be interconnected via a communications network 240 (which may include any of, or any combination of, a fixed-wire or wireless LAN, WAN, intranet, extranet, peer-to-peer network, virtual private network, the Internet, or other communications network such as POTS, ISDN, VoIP, PSTN, etc.) with a number of client computing/communication devices such as laptop computer 210, wireless mobile telephone 215, wired telephone 220, personal digital assistant 225, user desktop computer 230, and/or other communication enabled devices (not shown). Server 205 can comprise dedicated servers operable to process and communicate data such as digital content 250 to and from client devices 210, 215, 220, 225, 230, etc. using any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), virtual private network (VPN) security, or the like. Each client device 210, 215, 220, 225, 230, etc. can be equipped with an operating system operable to support one or more computing and/or communication applications, such as a web browser (not shown), email (not shown), or the like, to interact with server 205.

As used herein, the term "domain social network" is defined to include any connecting of a non-virtual, or virtual, identity with an Internet domain, such as based on ownership of or interests reflected on the domain on a network 240. More particularly, a domain social network may automatically feed domain data regarding the domains followed by each of the afore-discussed identities, such as domain data regarding available social media activities or events of likely interest to each of the identities based on the followed domain(s), such as via web service or email service, to the identities who follow those domains on a front end, and to the domains that are followed on a back end. The domain information, social media activities and performance events related to the domain(s) followed by a particular identity may further generate business intelligence as to the interests of that identity.

An Internet domain typically represents an identity, such as of a business, as well as the branding and reputation of that business. As such, a domain name constitutes a business asset. In some cases, reliance or trust placed in the brand associated with the domain name asset may be used maliciously, such as by hackers or others who use that trust to spread spam or viruses on the Internet.

Therefore, domain name owners need to protect and cultivate the use of their respective brands. In part, this cultivation necessitates that domain owners know the social media data and website performance data regarding the owned domain(s), as well as that of competitive domains or related domains. It is highly desirable to know this social media data and website performance data about domains of interest before making any judgment, or entering into any engagement, such as for advertising. Gaining this knowledge in advance regarding oneself, ones' competitors, and Internet third parties prior to entering into web-based engagements, is good Internet "citizenship," at least in that learning about domains and domain-related data before that data is used or shared with others helps stem the spread of bad web pages, malicious software and viruses, spam, and the like, to users who have placed their respective trust in particular domains.

Search engines and user-generated content platforms, such as Facebook or Twitter, could use domain-related data, if available, to value a domain, or an identity associated with a domain to filter and protect its content, data and users, such as in avoiding malicious or low quality content, and for advertiser's purposes. However, prior to the advent of the present invention and its domain social network, search engines and user-generated content platforms did not have access to such data. Rather, if such data was desired, one had to search for third party data tracking entities, and open one's site to allow such entity to track, piece-by-piece, the domain information desired. Thereafter, such data would have to be manually searched in order to make use of it, and this manual search would need to be repeated for each domain owned or in which there was interest.

The present invention provides an engine, system and method for a domain social network that interconnects Internet users with at least domains owned or interested by those Internet users, and that may obtain and/or forward the dynamic data automatically, such as by web service or email service. The dynamic data may be used to filter and protect content and data of the respective domains, to protect users by identifying low quality web pages or malicious software or pages, to isolate or improve search results regarding the domain, and/or to improve Internet-based deal flow, such as advertising.

Figure 3:
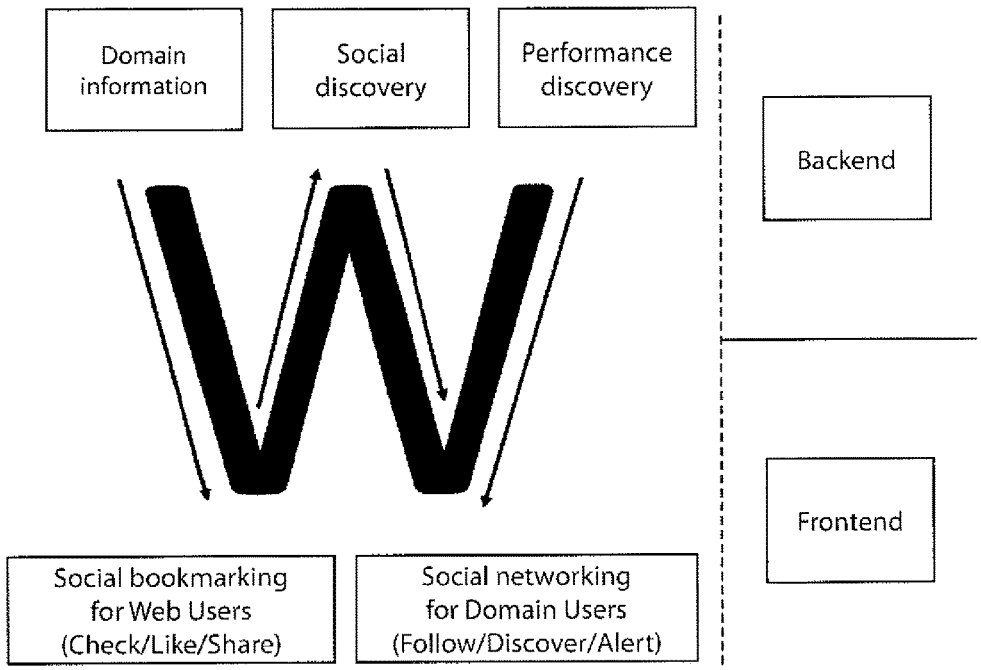
FIG. 3 is an illustration of aspects of the present invention.

In order to provide this engine, system and method, the present invention may include a front end engine and a back end engine, as illustrated in FIG. 3. Each of the backend engine and the front end engine may be or include, as discussed hereinabove with respect to FIGS. 1 and 2, at least one microprocessor, such as within a server, and at least one access node to at least one network, such as the Internet.

The backend engine, which may take the exemplary format illustrated in FIG. 3, for example, may automatically crawl and collect publicly available domain information, and may use that data to calculate a domain valuation (such as using a formula included in the aspects of the present invention) based on, for example, website traffic, number of followers/favorites markers, searchable page numbers and domain age.

The backend may also, for example, analyze a domain's "adult attribute," such as based on the domain link outs, keywords and the known adult attributes for certain domains. The backend may further compile domain-competitor data. The accumulated domain information may be generated, for example, as domain report data accessible to users. The access to this domain report data may be exposed, for example, by a browser bookmarklet, a browser add-on, or a domain social network website (hereinafter collectively "bookmarklet") that may provide a thin-client interface to reporting. Access may further include a vendor feed, such as via an application programming interface (API).

The domain social network bookmarklet may thus be, graphically, a front-end feature that is an add-on to any web browser. As such, it may be downloaded, or dragged and dropped or added via a favorites bar without a software download. In short, the bookmarklet may allow for "social bookmarking," that is, sharing of bookmarks with others, and indicating to domain owners whether a user has bookmarked the owned domain (such as for marketing/sales purposes).

The bookmarklet may give the user peace of mind for an unknown web site (such as by giving linkouts, keywords, and website physical location, for example), or may allow a user to follow a known domain (such as by indicating the domain, giving an option to follow, providing keywords, and providing competitors, for example), at the user's direction and upon production by the browser, for example. All such information may, of course, be accumulated by the back end for production by the bookmarklet front end.

Further, the providing of the bookmarklet may greatly enhance page views, and thus my contribute to, and allow the provider of the bookmarklet to obtain a share of, enhanced advertising revenue. For example, if the user requests the bookmarklet, such as by clicking "Track" on any given web page, the user may be enabled to "Check" the site (to return or receive information from), "Like" the site (which will bring friends to the site), or "Share" the site (which will invite friends to the site), based on the information provided in the bookmarklet. This increased traffic to the site will provide increased ad revenue correspondent thereto.

More particularly, and by way of non-limiting example, via the bookmarklet any Internet user may access the domain information from the backend engine, such as by viewing any web page providing a "Check," as discussed herein throughout. The Internet user may, by way of non-limiting example, indicate a "Like," a "Share," or a "Follow" action, such as to save any web page, share any web page to third party, and/or to follow the indicated domain in the domain social network.

The Check process may also trigger the backend engine to perform business intelligence social discovery and performance discovery, as discussed herein throughout. An increase in the number of users may thereby generate more discovery data and more domain information, thus increasing the safety, knowledge, and hence enjoyment of all Internet users, while additionally improving web-based economic transactions, such as advertising. Yet more particularly, the backend may generate social discovery data and performance data based on a data request, such as, by way of non-limiting example, by way of a "Discover."

A user may, such as via the front end, join the domain social network, and such joinder may include definition of the relationship with owned or interested domains. This may, by way of non-limiting example, be termed a "Follow." Further, to increase the convenience of a "Follow," a group name or tag may be assigned to followed domains.

Figure 4:
FIG. 4 is an illustration of aspects of the present invention.

As more particularly illustrated in FIG. 4, the backend system may generate domain information which may include valuation data and adult attribute data, and provide such information to the frontend. This information may be accessible by the user through the use of, for example, the aforementioned browser add-on, bookmarklet, website service, email service or phone service, such as by allowing certain aspects of the domain information to be presented to the user. A user may also become a member of the domain social network so as to follow particular domains of interest, for example.

Thus, in a manner similar to that discussed herein for tracked sites, the front end bookmarklet may provide, either to a surfing user or a domain owner, critical information regarding the health of the domain. Users employing this feature may allow registered users to follow any domain for its website information, ranking, competitive analysis, and performance tracking, as well as for social discoveries about its domains. Again, information regarding these factors is accumulated by the backend of the present invention, and provided to the front end.

As further illustrated in FIG. 4, the user may thereby be presented with metrics relevant to the URL being visited or to be potentially viewed. In addition to tagging the URL in accordance with specific user preferences, the user may be provided information regarding the title of the website, the amount of traffic to the website in a given period of time, a summary correspondent to the content of the website, related or competitive websites to the one of interest, a listing of websites which a referenced or "link out" from the site of interest, and the website origination location, for example.

The backend system further has discovery capabilities, such as for social discovery and performance discovery. Accumulated domain information and discovery data may feed to domain social network members automatically, such as by web service, email service or phone service. Domain information data may further feed to third parties by API.

The backend may collect each domain's identity information, traffic information, link outs, link ins, following or favorites marking, and adult attribute data, and may therefrom calculate domain valuation based on traffic data, searchable page data and domain age data. For example, domain age (based on year number) may be a weighted factor in the valuation. Domain age of less than one year may be weighted at less than 1.0, wherein a lower valuation represents a lower popularity. For example, a domain age of less than a certain period, such as three months, may be particularly risky for Internet users. As such, a website having a lower valuation that requests user information may pose a particular risk to the user. If that web page provides a majority of its linkouts to a targeted website, then the risk to the user that the page is a phishing or scam page for the target website is even higher. When such high risk web pages are detected, the alert data of that high risk may be sent to the domain owner of the targeted website if it joins domain social network. Likewise, individual users may be informed of the high risk of the web page.

A user may login to the domain social network to check the alert data at anytime, for example. Alternatively, the alert data may be batch updated, such as daily. The user may check alert data for a specific domain, or may group several domains together and check alert data for that group. For example, a web message (such as a Tweet®) may include a web page link to a domain having a very new domain age, or an adult tag, or a low domain valuation, this data indicated by the performance discovery, and/or indicated by an alert, may preclude addition of this domain to search engine results, such as to avoid mass spread of a potentially harmful web page across Internet users.

This "performance discovery" may be executed from at least one cloud computing platform, such as in multiple regions. Periodically, such as once an hour, the backends from multiple regions may read the most popular pages from a domain to calculate its loading time and page size. The down time of specific web pages may also be calculated. For example, in an embodiment of performance discovery, web page size data may be read, and if it is similar to a previous checkup, a quick loading time calculation may indicate acceptable performance without reading the full web page data. This may significantly reduce bandwidth usage but nevertheless maintain reliable checkups. In another embodiment of performance discovery, if a domain report has not been used by any users for a period of time (thus indicating that the domain is not popular), the loading time checkup may continuously use the aforementioned quick loading time checkup, such as by reading only the header data of the web page and calculating loading time or down time.

A user who joins the domain social network of the present invention may use an email address for identification and for completing the validation process. User IDs may also be incorporated from other social networks approved by the user and/or associated with the identified email address, for example. As would be known to those skilled in the art, third party social network platforms already associated with the user, and in particular with the user's email address, for example, may be queried and associated with the user of the present invention.

Once associated with the present invention, a registered user may follow any number of selected domain names. The user may also receive reports providing information about the followed web site(s), which may further include information about related websites and the interactions between third party users and the related websites. Similarly, a user may follow users within the system and may be provided information about that and other users' internet activity.

As illustrated in FIG. 4, for example, a user who is following at least one additional user may be provided information related to what web site(s) were visited, the duration of each visit, the content accessed, the relation between the visited websites (and to the bookmarked web sites of the following or followed user), and/or the content available or bookmarked from the internet. A user may refine such information by limiting the presented information to various keywords matches, for example.

A user may also claim ownership of a domain through a validation process administered through the present invention, and may thereby gain access to a data or additional data related thereto. For example, domain owners may provide trademark and/or keyword data related to branding for inclusion with a user's alert data. However, some alert data may only be provided to the domain owner.

As described previously herein, a social bookmarklet or browser add-on may allow a user to reach a marked web page from any web browser in any web device (computer, tablet, smart phone, etc). The present invention may, for example, cause a popup window to display information having at least basic domain information related to a current web page. The same window may also provide information related to the Like, Share, and/or Follow features discussed herein, and may trigger social discovery data from a current web page, such as via the backend engine through to other users. As such, the present invention may provide a portable aspect, such as a widget, that may provide the data and inventive elements for users as discussed herein. Further, a unification of followed page data may be thereby provided.

Figures 5, 6:
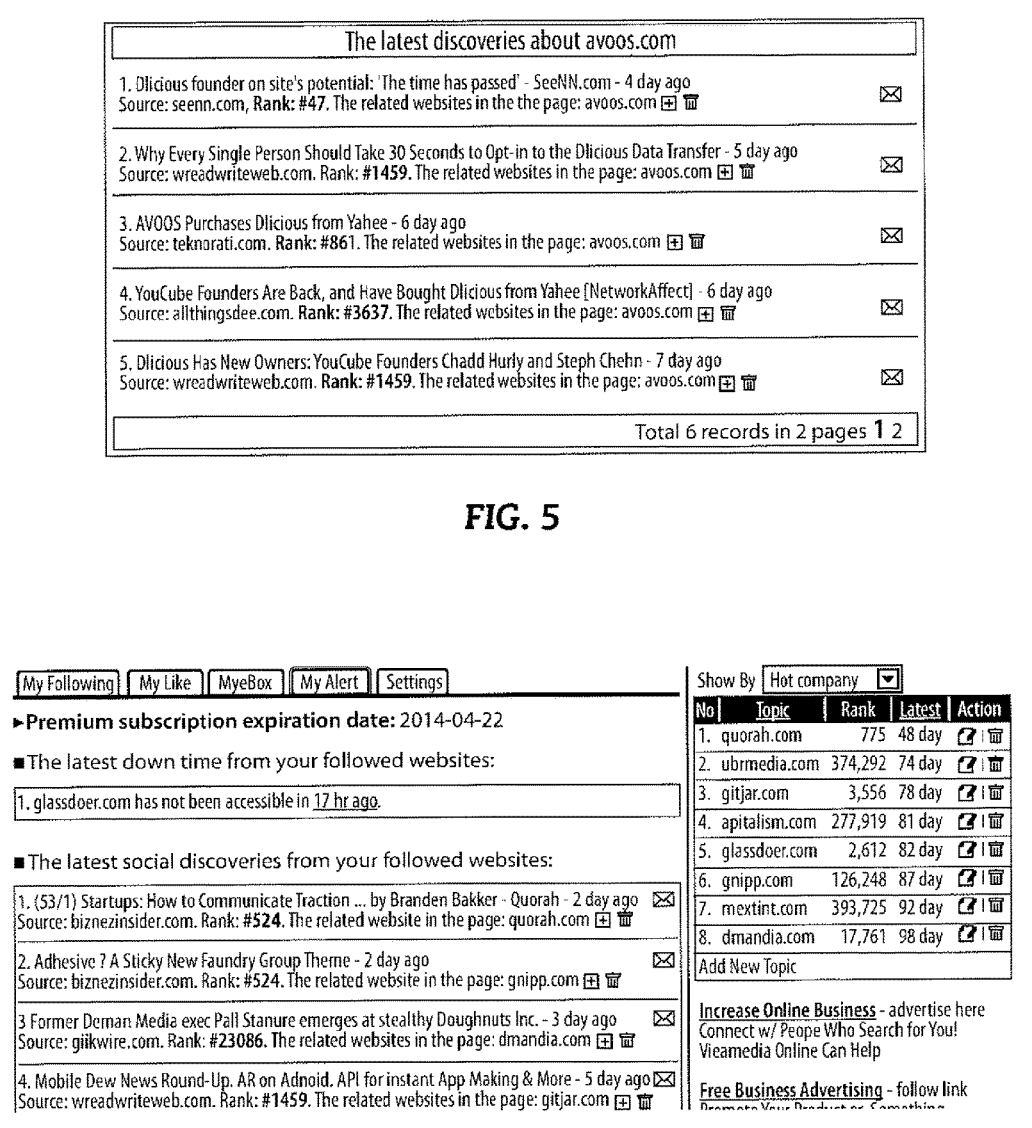

As illustrated in FIG. 5, social discovery from a web page may be facilitated through the filtering of web page content and/or with the use of business intelligence logic to connect the web page information to the related domain. For example, the social discovery functionality of the present invention may allow a web page to contain a web link whose display text has the domain name and link to such domain, which may be provided to the user as related to the user's metrics whether such metrics are inputted by the user or calculated by the present invention based on the user's internet activity.

Social discovery data for domains may be represented using keywords indicating business intelligence rules. For example, a user may follow a keyword instead of a domain name, and in such a case the present invention may use domain information data to get the most matched domain list for that keyword. By way of example, the keyword "spyware" may be linked to one set of domains that have the most high valuation with "spyware" in their respective domain information data (i.e., in their respective domain name, title, description, keywords, etc.). The social discovery data for such keyword may then be converted to obtaining social discovery for the indicated domain list.

In a further exemplary embodiment illustrated in FIG. 6, a user may compile a certain subset of Check gathered information to determine whether a particular web site meets the criteria the user has set, such as, for example, the website's popularity or overall access safety. Such information may include, for example, the topics covered by the website, the name of the website, the ranking provided by correlating third party usage, the number or ranking with respect to followers or favorite markers, a latest news posting, a social network posting related to the web site, and/or the time between visits to the web site by the user or a third party associated with the user, such as in the user's social network. Having such information available to the user may allow the user to make a determination as to the fitness and utility of the target website. Such information may also allow a user to qualify the usefulness of a website without ever having actually landed on or been availed to the direct content of the particular website.

A user may also allow certain third party posts about particular web sites to be displayed in the user's access panel. Such posts may provide a social network wherein the user may access opinion and content offered by the poster about the website of interest. Although such information may be included in the overall ranking associated with the website of interest, third party posts may include more detailed information and may allow the user to make a more refined decision as to the quality of the web site.

For example, a commenting user may provide a link to the web site being commented upon and may include a statement from original authorship or copy and paste some prior created content—whether directly from the web site being commented on or related content from a third party source. In any event, the present invention may also associate with the post information related to the web site, such as, for example, the ranking of the web site and an indication of when the post was created.

As further illustrated in FIG. 6, an alert may be based on user grouped domains to present the latest down time data and latest social discovery data. Similarly, an alert may send an email once a day to a domain user for latest social discovery data based on user followed domains and may send instant communications to a domain user when detected down time based on used followed domains.

Additionally, FIG. 7 is an illustration of the following of a domain (symantec.com in this case), and the obtaining of social discovery data and domain information related thereto. This information may be shared, in accordance with the present invention, such as by email, with other users who may read the social discovery data and elect to also follow the domain. Thereby, the present invention provides viral marketing of the domain. Further, in this exemplary embodiment, the social discovery data may reveal the discovery by the domain of a security flaw and data leak by a third party website, and multiple media websites with a link to the domain. Thus, the story may be cached by the backend and linked to the domain.

In an embodiment of the present invention, the user of the system may provide a search term which may return results from a user associated social network or domain traffic list. The use of a limited data set associated with the users may allow for a more reliable and/or relevant return of search results. For example, by calling domain social network data associated with the user, the user initiated search may obtain the best matched domain result. The data may, for example, be ordered by traffic ranking or by social recommendations. Such social recommendations may be made by linking to social networks associated with the user and may record and/or review prior activity by the user and/or third party users further associated with the user.

Searching in the present embodiment may be facilitated by any known search engine, such as, for example Bing® and Google®, and may utilize any accessible domain listing as a searching source to obtain matched web content links as correlated to the entered search term. Further, the search functionality of the present invention provides more than mere manual search, as described herein, the search functionality includes the searching of cached information monitored by a particular topic or search term(s) for a determined period of time. Similarly, the search may include web content available only from dedicated domains.

Figure 8:
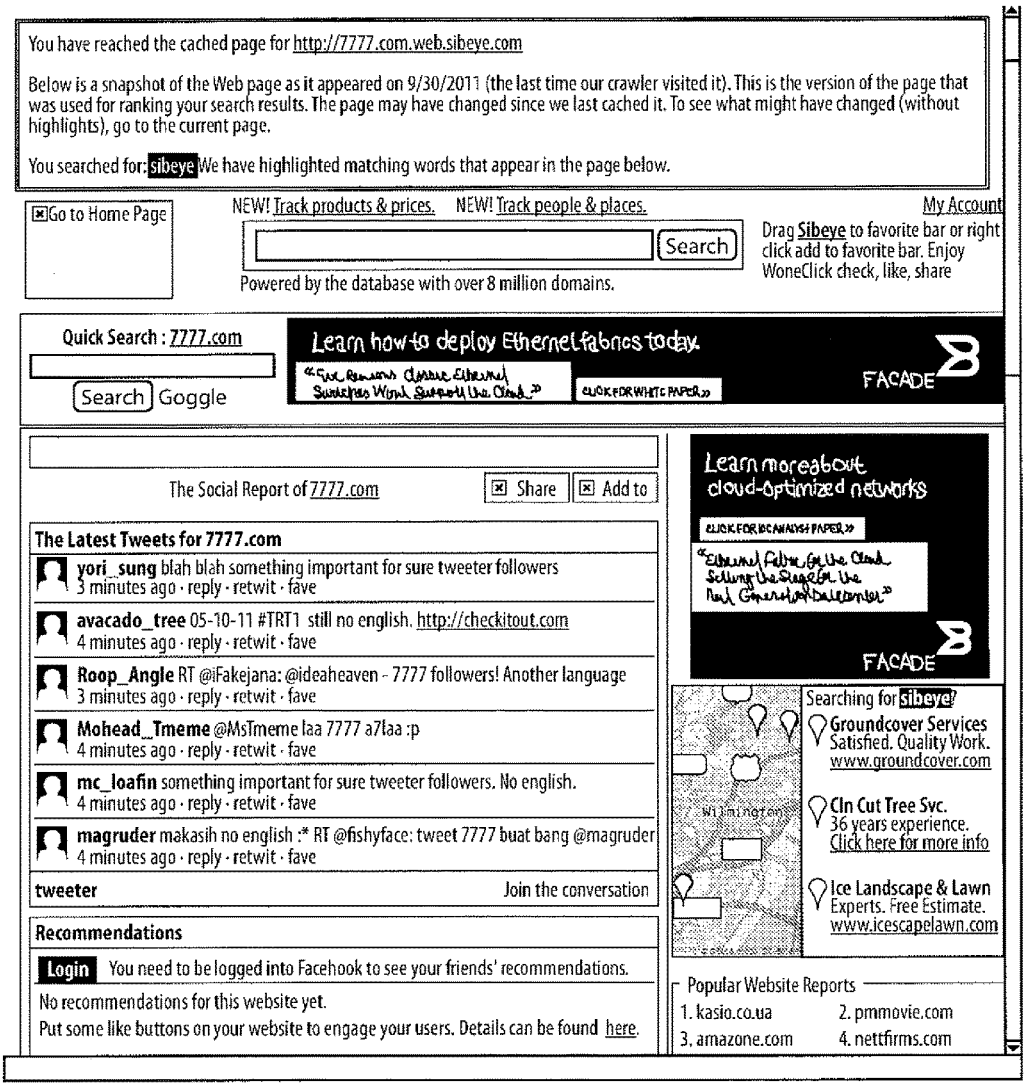
FIG. 8 is an illustration of a capture aspect of the present invention.

The present invention may further employ at least one web crawler to return web content links, analyze the web content associated with user's search term, and take at least one screenshot for the matched web page. As illustrated in FIG. 8, a time-marked screen shot may be taken of at least one page of returned website and may be cached within a system accessible database. The present invention may further highlight or otherwise make known to a user which terms within the returned web page provided the basis for the return of the page. In an embodiment of the present invention and as illustrated in FIG. 8, the search term(s) used by the user may be highlighted and the ranking of returned results may be based off of, for example, the frequency of such term(s) within the returned webpage.

Thus, the present invention may allow for deep searching with screen capture which may allow a user to visually "tune up" search results to adapt to the best search source. This process may be automated and may allow for an optimization report to be generated which may include, for example, at least one returned result and the number of term(s) and/or term frequency identified. Automated searching and/or optimization may be continuous and/or set to a predetermined time frame such as, for example, hourly and/or daily. Similarly, as would be appreciated by those skilled in the art, the present invention may broaden the search scope of a particular search term by allowing for near and like term(s) to be included in the search results.

Figure 9:
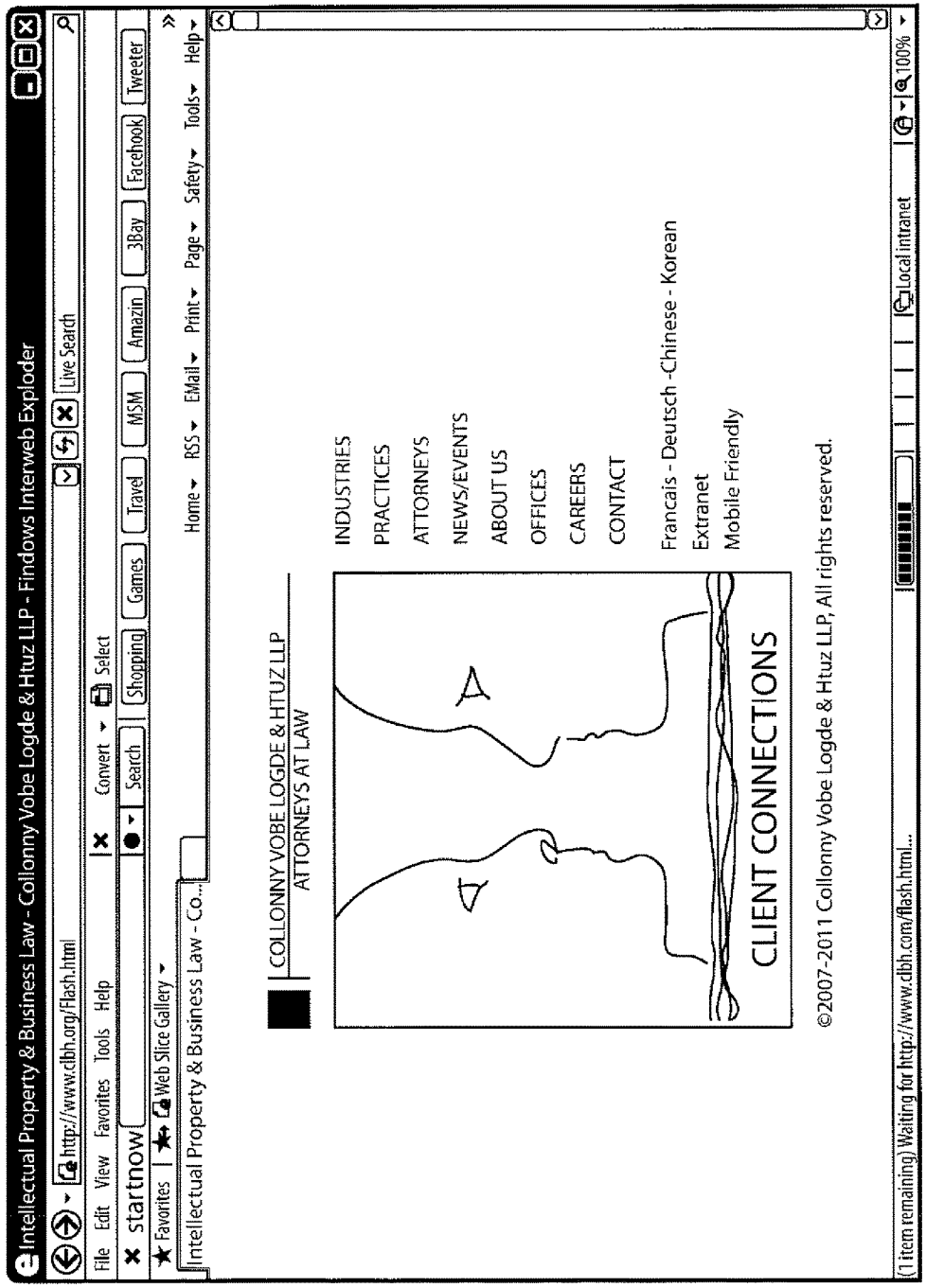
FIG. 9 is an illustration of an aspect of the present invention.

In an embodiment of the present invention, a GUI may be provided to facilitate the automatic return of results and presenting of results from a high value search source. As illustrated in FIG. 9, a toolbar may be incorporated in to a web browser to allow the user ready access to the functionality of the present invention. In addition to allowing a user to enter a free form search term(s), the present invention may also group searches and/or results by category and provide access to such groups using a single click button. For example, returned results may include at least one travel related website. To increase searching efficiencies, the present invention may group at least one returned result with other third party resources, including domains associated with user social network association, under a single "travel" tab. Clicking on this tab may return immediate results, such as those most recently returned, or may provide an additional search interface which may further provide the user with the opportunity to free form search or click on links representing previously returned results related to travel, for example.

Figure 10:
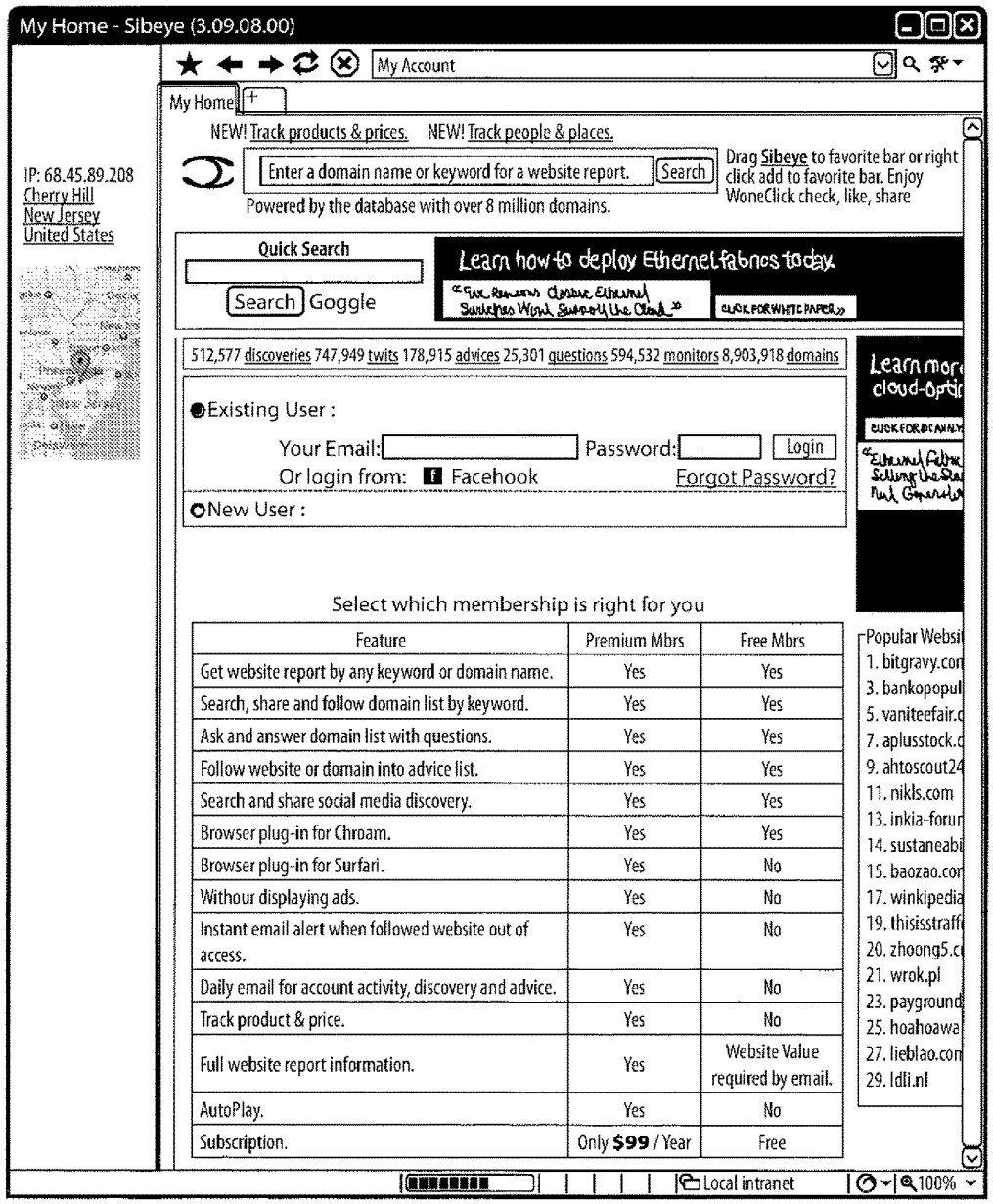
FIG. 10 is an illustration of an aspect of the present invention.

The present invention may, for example, as illustrated in FIG. 10, provide a multi-tab browser GUI and may present at least one report regarding a particular keyword(s) or domain name(s). Such a site report, as described herein, may provide a website valuation based on the website's traffic ranking, searchable pages and domain name history. Similarly, a keyword report may be provided showing the at least one keyword list associated with a particular website and may allow comparisons to other websites having the same or similar keyword(s).

By way of specific example, the present invention may provide a link report which may provide information related to what a particular web site link to, as well as what the web site links in. An intelligence report may provide information related to what web sites share the same IP address(es) and which web sites have the same title and/or description, such as mirror sites, for example. The present invention may also provide competitive reports based on similarities between web sites, such as in relation to key words and/or images used.

Further, a domain connection report may provide an accounting of which web sites have the same third party provider accounts, such as, for example, accounts with Google® and GoDaddy®, and/or which web sites have the same or similar title and/or description data in home page.

The present invention may also allow for real-time reporting which may allow a user to very quickly search or browse various websites to identify at least one which may meet their needs. By way of non-limiting example, when browsing to a particular web page, the present invention may provide, through a bottom panel window, for example, the web site title, description, keyword(s), linked out web site address and related web sites. The present invention may also allow the user to make social link to any given web page through social media links to, for example, Facebook® and Twitter®, through a one click activation feature, for example.

Thus, in an embodiment of the present invention, a desktop program may be providing having at least the features described herein above. Through the local program, a user may authenticate and/or connect to a user controlled social network site, such as Facebook® and Twitter®, for example, and may further employ at least a second set of privacy and/or protection rules to both the local machine and the social network site. For example, through a "connection lock," the user may change a Facebook® profile and remove/restrict access to certain sites through or from Facebook®. Further, the local program may allow for each social website to be provided a dedicated and distinct set of rules which may further be displayed in discrete windows. Similarly, information related to the user and the social network site may be displayed. Such information may include, for example, interaction history, interconnections between a social network site and third party sites, and authorized and/or blocked sites according to the rules set by at least one user.

For example, the local program may allow a parent to view the activity of a child on the child's Facebook® page and may further allow the parent to control access to other sites navigable through Facebook®. The parents may also view and restrict third party cookies, embedded links and/or tracking programs which follow and/or are availed of the child's page, for example. The present invention may additionally group such third party websites and tracking devices and provide characterizations such as "safe", "unsafe", "naughty" and/or "nice," for example. As would be apparent to one skilled in the art, the classification given to grouped URLs may take any form and/or rating and may be based on keyword(s) within the URL and/or on comparison to a known list of URLs constructed to provide a predetermined listing of URLs of a specific classification.

Figure 11:
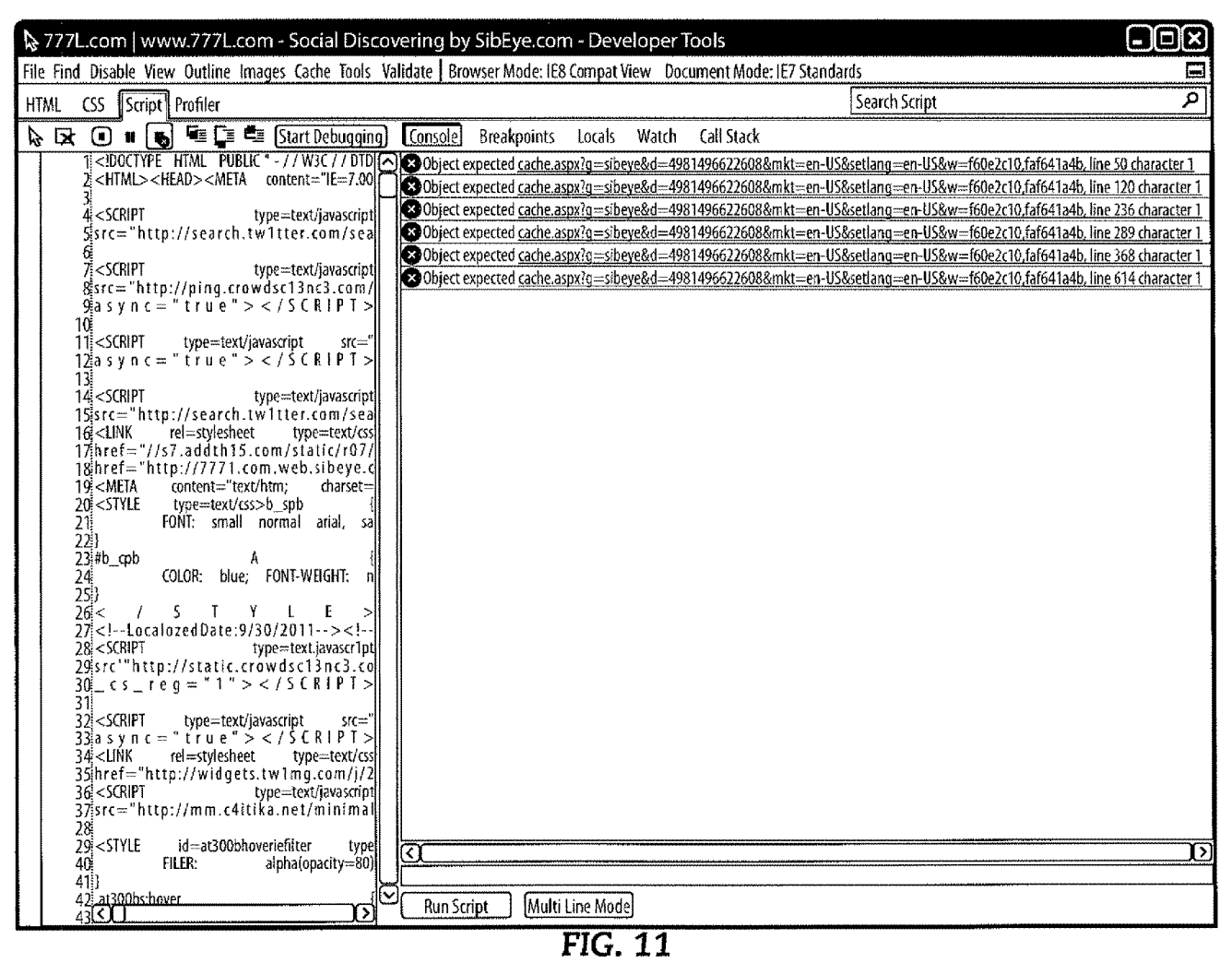

In an embodiment of the present invention, at least one keyword(s) may be entered to search web pages in the past, current and future, automatically. Returned results may be viewed in a calendar and/or timeline format or by discovery/search term defined by the user. In any search, safe mode may be entered to block unwanted content, such as, for example, adult content. The present invention may also support proxy settings which may allow a user to make private returned results, searching queries, and/or browsing. As illustrated in FIG. 11, the present invention may further provide a developer tool GUI to better facilitate the embodiments described herein.

For example, the present invention may allow an entity to monitor a website and/or traffic for privacy and content alerts. Use of the present invention may be provided on a subscription basis and may, for example, be subscribed to for $39 per month per subscription. Alternatively, the present invention may be accessed through an annual subscription, such as, for example, $99 per year. As user may then have the ability to 1) track competitor social data; 2) track locations of users; 3) track price history of various products and/or services; and 4) enable convenient protection of email and social network accounts.

Those of skill in the art will appreciate that the herein described systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

I claim:

1. A computer-implemented method for improving Internet-based transaction flow in a domain social network, with at least one computing device, the method comprising the steps of:
   creating the domain social network by interconnecting a plurality of users with a plurality of first and second domains;
   obtaining dynamic data from a service;
   filtering the plurality of first and second domains based on the dynamic data;
   providing social discovery data of the filtered plurality of first and second domains in response to receiving, from at least one of the plurality of users, a social discovery data request; and
   displaying the provided social discovery data on a display to the requesting one of the plurality of users.

2. The method of claim 1, further comprising:
   generating, based on the filtering, domain report data for each of the plurality of first and second domains; and
   displaying the domain report data along with the social discovery data to the at least one of the plurality of users.

3. The method of claim 1, wherein the dynamic data identifies low quality content.

4. The method of claim 1, wherein the dynamic data identifies malicious content.

5. The method of claim 1, wherein the service is a web service or an e-mail service.

6. The method of claim 1, wherein the social discovery data comprises at least one of the following: domain valuation data, adult attribute data, domain health data, domain ranking, domain competitive analysis, and domain performance tracking data.

7. A computer program product embodied on a non-transitory computer readable medium, the product comprising instructions when executed by a processor implement a method for improving domain search results in a domain social network, the method comprising:
   creating the domain social network by interconnecting a plurality of users with a plurality of first and second domains;
   obtaining dynamic data from a service;
   filtering the plurality of first and second domains based on the dynamic data;
   providing social discovery data of the filtered plurality of first and second domains in response to receiving, from at least one of the plurality of users, a social discovery data request; and
   displaying the provided social discovery data on a display to the requesting one of the plurality of users.

8. The product of claim 7, further comprising:
   generating, based on the filtering, domain report data for each of the plurality of first and second domains; and
   displaying the domain report data to the user.

9. The product of claim 7, wherein the dynamic data identifies low quality content.

10. The product of claim 7, wherein the dynamic data identifies malicious content.

11. The product of claim 7, wherein the service is a web service.

12. The product of claim 7, wherein the service is an e-mail service.

13. The product of claim 7, wherein the social discovery data comprises at least one of the following: domain valuation data, adult attribute data, domain health data, domain ranking, domain competitive analysis, and domain performance tracking data.

14. A system for improving domain search results in a domain social network, the system comprising:
   a computer comprising a memory communicatively coupled to at least one processor, the computer configured to:
   create the domain social network by interconnecting a plurality of users with a plurality of first and second domains;
   obtain dynamic data from a service;
   filter the plurality of first and second domains based on the dynamic data;
   provide social discovery data of the filtered plurality of first and second domains in response to the reception of, from at least one of the plurality of users, a social discovery data request; and
   display the provided social discovery data on a display to the requesting one of the plurality of users.

15. The system of claim 14, wherein the computer is further configured to:
   generate, based on the filtering, domain report data for each of the plurality of first and second domains; and
   display the domain report data to the user.

16. The system of claim 14, wherein the dynamic data identifies low quality content.

17. The system of claim 14, wherein the dynamic data identifies malicious content.

18. The system of claim 14, wherein the service is a web service.

19. The system of claim 14, wherein the service is an e-mail service.

20. The system of claim 14, wherein the social discovery data comprises at least one of the following: domain valuation data, adult attribute data, domain health data, domain ranking, domain competitive analysis, and domain performance tracking data.

* * * * *